United States Patent [19]

Kramer et al.

[11] 4,437,688
[45] Mar. 20, 1984

[54] RISER PIPE JOINT

[75] Inventors: James H. Kramer, Akron; Roy L. Orndorff, Jr., Kent, both of Ohio; James M. Stephens, Grandview, Mo.

[73] Assignee: The B. F. Goodrich Company, New York, N.Y.

[21] Appl. No.: 342,447

[22] Filed: Jan. 25, 1982

[51] Int. Cl.³ .................. F16L 17/00; F16L 27/12
[52] U.S. Cl. .................................... 285/95; 285/165; 285/302; 285/DIG. 1
[58] Field of Search ............... 285/95, 302, DIG.1, 285/165

[56] References Cited

U.S. PATENT DOCUMENTS 4,018,463  4/1977  Campbell ............... 285/DIG. 1
4,311,327  1/1982  Ortloff et al. ........... 285/DIG. 1

Primary Examiner—Richard J. Scanlan, Jr.
Attorney, Agent, or Firm—Joseph Januszkiewicz

[57] ABSTRACT

The present invention is directed to slip joint means for use in connecting pairs of axially spaced risers in an off-shore multi-line riser system that conveys petroleum from a collection point on the ocean floor to a floating buoy for delivery to tankers. The slip joint permits considerable latitude in the movement of the riser system yet assuring leak proof joints at the points of movement by providing elastic seals that facilitate motion between conveying conduits.

2 Claims, 5 Drawing Figures

RISER PIPE JOINT

BACKGROUND OF THE INVENTION

This invention relates to a riser system of an off-shore production well and more particularly to a new and improved slip joint for use in a riser system.

Upon the completion of off-shore oil wells which include crude oil and gas, it is necessary to provide means for collecting and/or transfering the crude oil to tankers from the collection point of the completed wells. One proposed system for use in deep waters is a multi-line riser system which would include among other equipment a riser base for attachment to the sea floor or ocean floor, a plurality of determinate length risers, supply pipes, universal joints for connecting the risers and mouring buoys or top support buoys along with mechanisms for use in loading the output of the production into storage vessels or ships.

Early in the development of the recovery of crude oil from off-shore production facilities, fixed platforms were used in the recovery system only in shallow waters and as exploration extended into deeper waters, it was important to provide a platform with tension legs as in U.S. Pat. No. 3,934,528. The present invention is directed to the use of rigid columns and risers with a universal joint that couples the several rigid risers to provide an articulated column. A production riser or column is a series of vertically spaced supports interconnected by universal joints with one end of the column of risers connected to a rigid or fixed base and the other end of the column of risers connected to a buoy. In use herein, the term "production" refers to a completed well or wells and is directed to the recovery of the crude oil or gas in contrast to the drilling for the crude oil or gas. The base of the risers serves as the collection point for the several wells that are producing. The riser supports a plurality of vertically extending pipes for conveying the oil. The universal joint connects the ends of the adjacent risers permitting articulation therebetween and also supports the slip joints as well as swivels that interconnects the rigid pipes from one riser to rigid pipes of an adjacent riser. The use of rigid flow lines such as pipes depend on the slip and swivel joints to take up all the stresses and forces that are a result of the tremendous operating conditions of wave action, and unusual weather conditions. Flexible hoses are not suited for marine application because of the need for large diameters for transmission of fluids and the ability to withstand high pressures.

The slip joint of the present invention has sealing means operative under high internal pressures yet pressure balanced. Such sealing means permits the joint to sustain very large movements due to external forces while at the same time permitting oscillating motions with freedom for rotation and axial movement. The present invention greatly increases the space efficiency of the riser system for off-shore production fields.

SUMMARY OF THE INVENTION

The present invention contemplates a slip joint for use in an off-shore marine environment wherein a pair of axially extending tubular members have elastic sealing means captively engaged therebetween. One of the tubular members is bonded to the elastic sealing means while the other tubular member frictionally engages and compresses the seals against a portion of the one member.

DETAILED DESCRIPTION

Figure 1:
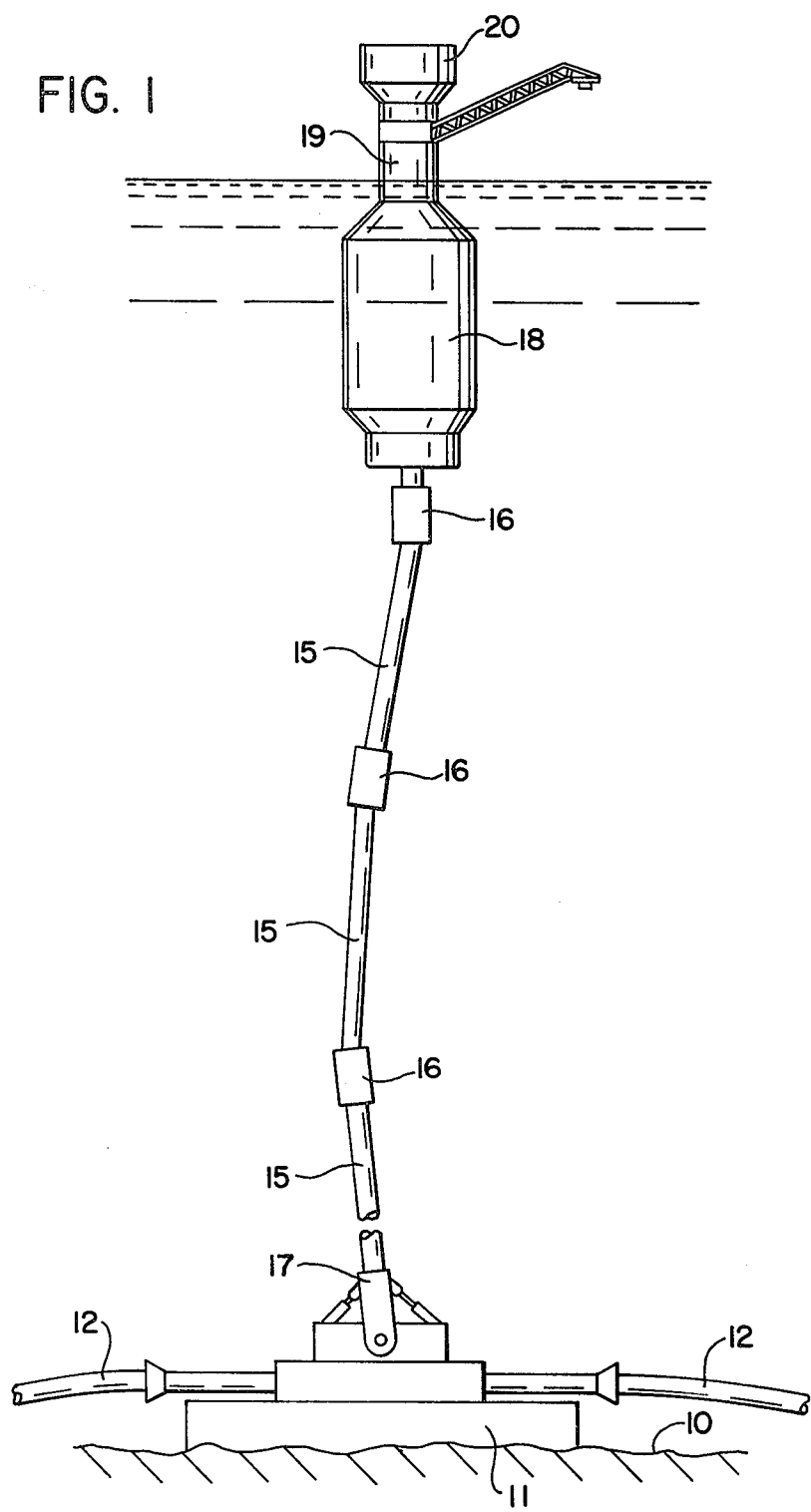
FIG. 1 is a schematic side elevational view of a multi-riser system in a deep water environment.

Referring to the drawings wherein like reference numerals designate like or corresponding parts throughout the several views, there is shown in FIG. 1 a seafloor 10 to which a base 11 is suitably anchored. The base 11 houses a manifold or storage means for crude oil which is pumped thereto via pipelines 12 from satellite production facilities. A plurality of vertically aligned risers 15 interconnected by universal joints 16 are connected to the base by an articulated joint 17. The uppermost universal joint 16 is connected to a buoy 18 which supports a column 19 and a housing structure 20.

Figure 2:
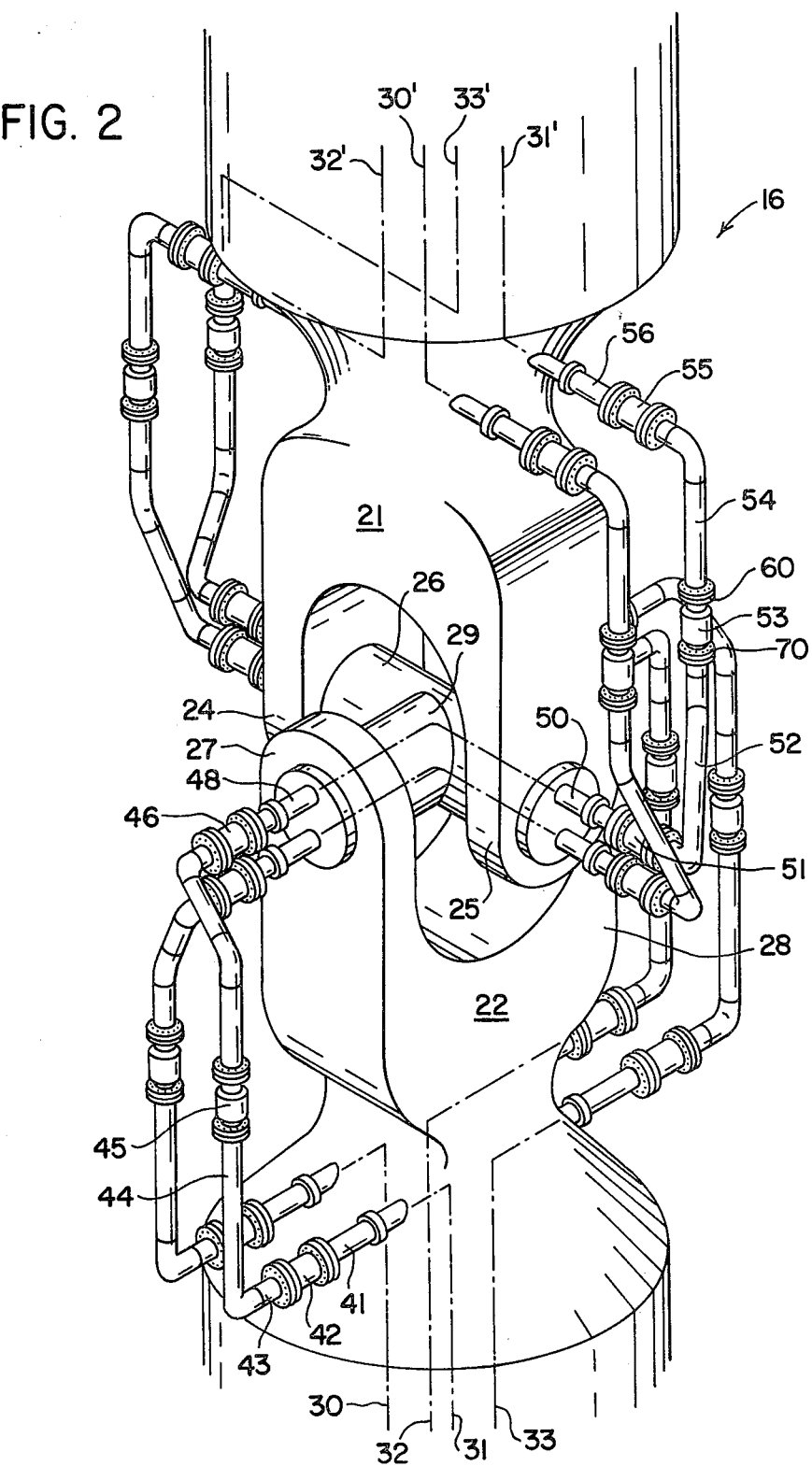
FIG. 2 is an isometric view of a universal joint in the multi-riser system.

As seen in FIG. 2 the universal joint 16 has an upper yoke member 21 and a lower yoke member 22. Yoke member 21 has a pair of depending leg portions 24-25 supporting a laterally extending bearing member 26 therebetween. Yoke member 22 has a pair of upwardly extending leg portions 27-28 supporting a laterally extending bearing member 29. With bearing members 26 and 29 interconnected at their juncture, the respective yoke members 21 and 22 are permitted to pivot at right angles to each other on their respective bearing members about axes that are normal to each other.

Yoke member 22 has a hollow lower portion which is adapted to carry a plurality of conduits vertically therethrough. Only four conduits 30-31-32-33 are shown in FIG. 2 although many more conduits are contemplated. Only four conduits are shown to provide a clearer understanding of the invention. Conduit 31 is connected to a conduit 41, which conduit 41 extends outwardly externally from the yoke 22 for connection to a swivel joint 42. Swivel joint 42 in turn is connected via a vertically extending conduit 43-44 to a slip joint 45, which in turn is connected via suitable conduits to a swivel joint 46, which swivel joint 46 is connected to a conduit 48 that extends through bearing member 29 into bearing member 26 for connection to a horizontally extending conduit 50. Slip joint 45 permits limited axial movement between adjacent conduits. Conduit 50 is connected to a swivel joint 51 thence to conduit 52 and slip joint 53. Slip joint 53 permits a limited axial movement between conduit 52 and a conduit 54. Conduit 54 is connected to one end of a swivel joint 55 which in turn is connected to a conduit 56, which conduit 56 extends into yoke member 21 for the conveyance of oil via a conduit 31' to a subsequent conduit through the risers 15 for eventual connection to a storage facilities in the buoy 18 for discharge to a waiting tanker that is moored to support column 19. In a similar manner conduits 30-32-33 in Yoke 22 are connected by conduits, swivels and slip joints to respective conduits 30'-32'-33' in yoke 21 for eventual connection through suitable conduits through the respective risers 15 to the storage facilities in the buoy 18 for subsequent or immediate unloading to a tanker that is moored to support column 19.

All of the slip joints such as joints 45 and 53 are similar in construction and only one such slip joint will be described. Slip joint 53 (FIG. 3) has an inner tubular member 58 and an outer tubular member 59.

Outer tubular member 59 has an annular or flanged end portion 60 with a plurality of circumferentially spaced bores 61 to provide means for connecting one end of such slip joint 53 to the adjacent conduit 54. Tubular member 59 has a plurality of stepped bores 63 and 64 extending inwardly from the flanged end portion 60. The respective bores 63 and 64 are succeedingly of larger diameter as viewed from the flange portion 60.

Figure 3:
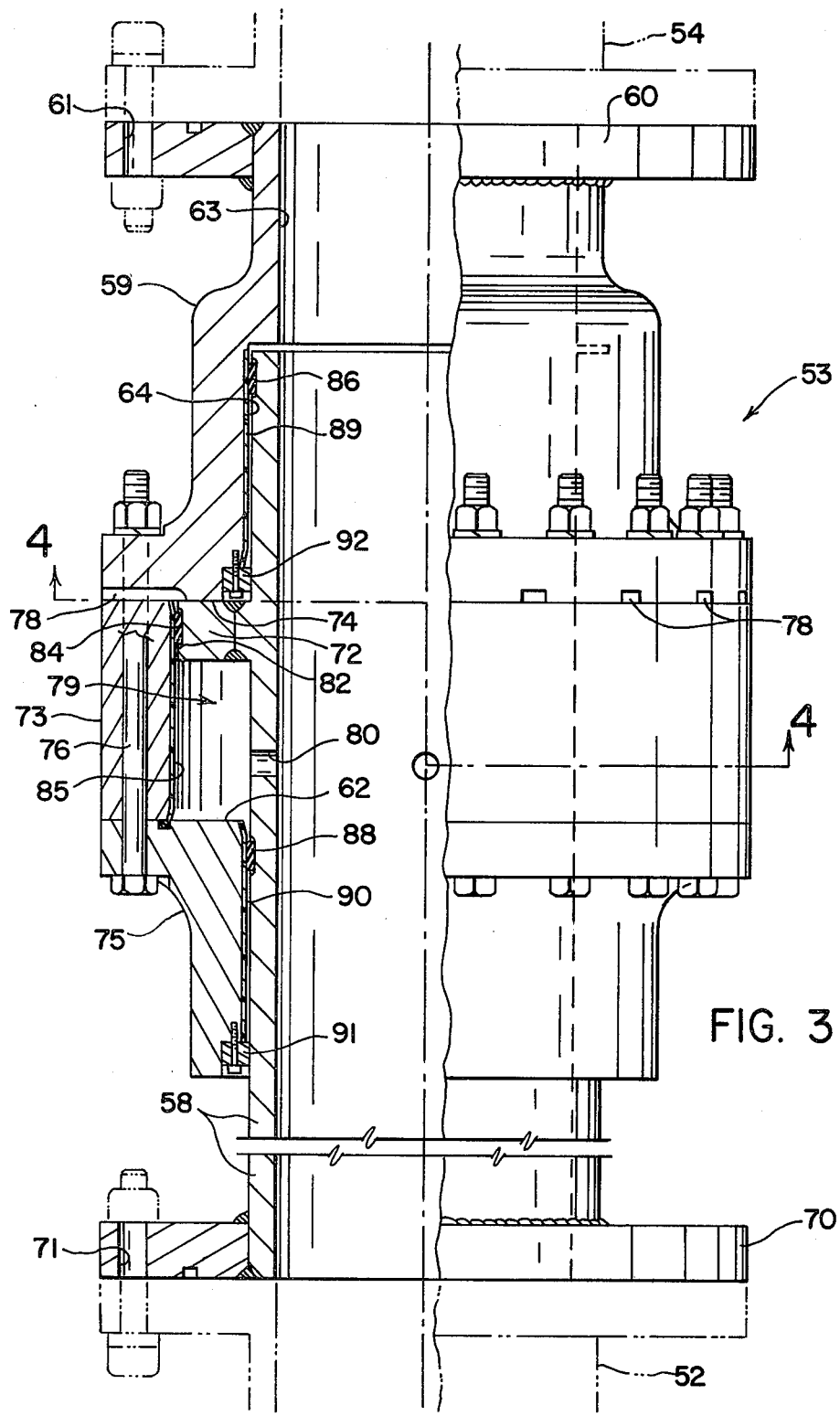
FIG. 3 is a side elevational view of a slip joint with a portion broken away to show in cross-sectional the interconnected tubular members and their related auxiliary parts.
Figure 4:
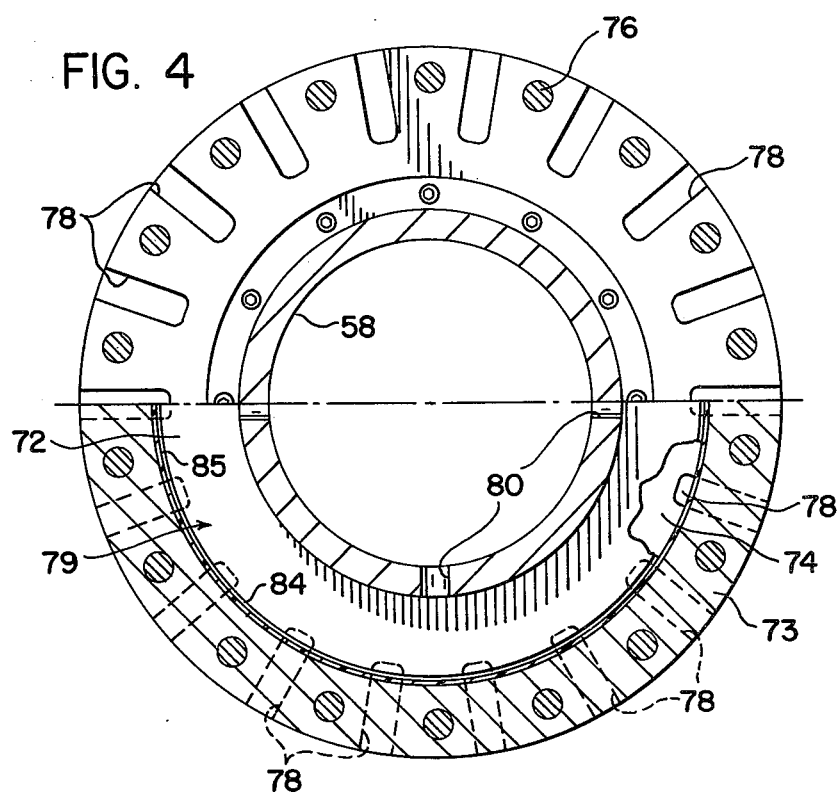
FIG. 4 is an end view of the end cap of a slip joint taken on line 4—4 of FIG. 3.

The one end of inner tubular member 58 has an external diameter that permits a sliding fit with bore 64. The other end of tubular member 58 has an annular or flanged end portion 70 with a plurality of circumferentially spaced bores 71. Such flanged end portion 70 is welded to the tubular member 58 after assembly with outer tubular member 59. Such flanged end portion 70 provides a means for securing the slip joint 53 to the adjacent conduit 52. Located intermediate the flanged end portion of inner tubular member 58 is an annular abutment 72 which acts as a piston with a sleeve 73 that has its one end secured to tubular member 59. The outer end of sleeve 73 abuttingly engages a flanged sleeve 75. Flanged sleeve 75, sleeve 73 and tubular member 59 have a plurality of aligned bores which receive threaded bolts 76 to provide an integral outer tubular housing within which inner tubular member 58 is adapted to reciprocate. The sleeve 73, flanged sleeve 75 and outer tubular member 59 cooperate with the inner tubular member 58 to define a chamber 79 within which the abutment 72 is located. The piston or abutment 72 is adapted to engage the annular abutment or shoulder 74 on outer tubular member 59 or annular abutment or shoulder 62 on flanged sleeve 75. The end face portion of outer tubular member 59 that abuttingly engages the one end of sleeve 73 has a plurality of ports 78 that vent that portion of chamber 79 that is located between piston 72 and the annular shoulder 74 to ambient or atmosphere through ports 78 while that portion of chamber 79 that is located between piston 72 and annular shoulder 62 is vented to the bore of inner tubular member 58 by means defined hereinafter. Chamber 79 is thus defined as the annular space located between the sleeve 73 and the outer intermediate portion of inner tubular member 58. The abutment or piston 72 operates within chamber 79. The inner tubular member 58 has a plurality of circumferentially spaced bleeder ports 80 that equalizes the pressure in chamber 79 with the pressure inside the tubular member 58 when abutment 72 is in an upwardmost position as seen in FIG. 3 exposing ports 80 to such chamber. The outermost circumferential edge of abutment 72 is grooved as at 82.

A ring 84 of elastomeric material suitable for service exposure to both lubricating oils and sea water is bonded or similarly suitably secured to the outer peripheral surface of groove 82 on abutment 72.

The term elastomer is defined as a substance that can be stretched at room temperature to at least twice its original length and, after having been stretched and the stress removed, returns with force to approximately its original length in a short time. (See Glossary of Terms as prepared by ASTM Committee D-11 on Rubber and Rubber-like Materials. Published by the American Society for Testing Materials).

The elastomeric or rubber materials that can be used include natural rubber, copolymers of butadiene and acrylonitrile, copolymers of butadiene and styrene, copolymers of butadiene and alkyl acrylates, butyl rubber, olefin rubbers such as ethylene-propylene and EPDM rubber, flurocarbon rubbers, flurosilicone rubbers, silicone rubbers, chlorosulfonated polyethylene, polyacrylates, polybutadiene, polychloroprene and the like.

Preferred elastomeric materials include natural rubber, copolymers of butadiene/acrylonitrile and copolymers of butadiene and styrene which is often referred to as SBR.

Figure 5:
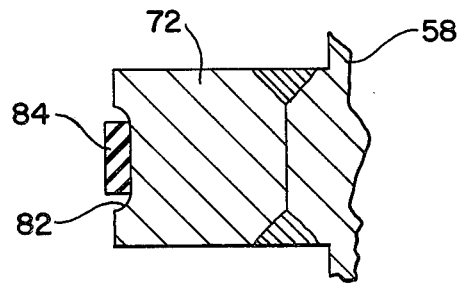
FIG. 5 is a fragmentary front elevational view of a portion of the inner tubular member taken on line 5—5 of FIG. 3.

Such elastomeric ring or seal 84 of abutment 72 is under compression when assemblied within sleeve 73 of outer tubular member 59. Prior to assembling the slip joint, such ring 84 expands radially in the normal uncompressed condition such that there is substantial clearance space to either side of ring 84 on abutment 72. As seen in FIG. 5, the annular elastomeric seal 84 in the normal condition prior to assembly also extends radially outwardly a distance slightly greater than the outer periphery of groove 82 such that in the compressed condition such seal 84 is effectively sealed in the groove 82. An annular ring or seal 85 made of a material such as from polytetrafluoroethylene is suitably secured as by bonding to the inner peripheral surface of sleeve 73 of outer tubular housing. In the compressed state of elastomeric ring 84, the outer surface thereof comes into frictional contact with the seal 85 and the edges of the groove 82 such that the groove provides support for the seal against pressure differentials. A second annular elastomeric ring 86 is mounted on the outer peripheral surface of inner tubular member 58 closely adjacent the flanged end of outer tubular member 59 in a suitable groove such that it operates in the same manner as ring 84. The other end portion of inner tubular member 58 between flange 70 and ports 80 is suitably grooved to receive a third elastomeric ring 88 that operates in the same manner as ring 84. The surface of inner bore 64 and inner bore surface of flanged sleeve 75 has an annular ring or seal 89 and 90 respectively of a material such as polytetrafluoroethylene secured thereto as by bonding. The one end portion of flanged sleeve 75 is recessed to receive a bearing 91 which has an inner surface that frictionally engages the outer surface of inner tubular member 58. The outer tubular member 59 adjacent to sleeve 73 is recessed to receive a bearing 92 whose inner surface frictionally engages the outer surface of one end of inner tubular member 58.

In the operation of the slip joint 53 which permits relative axial movement between conduits 52 and 54 on off centerlines of adjacent risers 15, it is assumed that abutment or piston 72 is in the position shown in FIG. 3 wherein abutment 72 is in abutting engagement with an annular abutment 74 in the outer tubular member 59. In this condition, chamber 79 is pressurized via ports 80 with the fluid that flows through the tubular members 58 and 59. Upon displacement of risers 15 in an upward direction due to external forces such as wave action, the risers 15 tend to move in an upward direction, which action is manifested in a movement of conduits 52 and 54 axially away from each other thereby moving abutment 72 downward as viewed in FIG. 3. The fluid in chamber 79 is moved inwardly into tubular member 58 via ports 80 while that portion of chamber 79 that is above the piston or abutment 72 as viewed in FIG. 3 is pressurized via ports 78 from the external fluids surrounding the slip joint 53 to provide a pressure balanced slip joint. During this axial movement of the respective tubular members 58 and 59 the respective ring seals 84, 86 and 88 absorb axial elastic deformation. Upon any extended axial movement between tubular members 58 and 59 the ring seals 84, 86 and 88 will move with inner tubular member 58 while their outer peripheral surfaces will slide on the respective surfaces of sleeve 73, the inner surface of bore 89 and the inner surface of the bore of flanged sleeve 75. The elastomeric or rubber seals 84, 86, and 88 absorb the axial thrust in the rubber until the thrust equals the frictional forces exerted by the polytetrafluoroethylene materials 89, 85 and 90. At this point, the rubber will slip on the surface of the polytetrafluoroethylene material.

Various modifications are contemplated and may obviously be resorted to by those skilled in the art without departing from the described invention, as hereinafter defined by the appended claims, as only a preferred embodiment thereof has been disclosed.

We claim:

1. A universal joint for use in connecting a pair of axially spaced risers that are subjected to torsional twisting forces, each of said risers having a plurality of conduits, swivel means and slip joint means interconnecting conduits in one riser to conduits in an adjacent riser, said slip joint means being located off-center of said risers, each of said slip joint means having a longitudinally extending inner tubular member and a longitudinally extending outer tubular member, each of said tubular member having a flanged end for connection to adjacent conduits, an annular abutment on the intermediate portion of said longitudinally extending inner tubular member, said inner tubular member having a first circumferentially extending groove on the one end portion of said inner tubular member that is opposite said flanged end, a circumferential extending groove on the periphery of said annular abutment, said inner tubular member having a second circumferentially extending groove spaced between said abutment and said flanged end a distance from said abutment that is at least equal to the distance that said first groove is spaced from said abutment, an annular sealing member of elastically deformable material bonded to each of said grooves, each of said annular sealing members having an outer surface frictionally engaging an adjacent inner surface of said outer tubular member, said outer longitudinally extending tubular member having an enlarged intermediate portion that cooperates with said inner tubular member to define a chamber with axially spaced annular shoulders, said annular abutment of said inner tubular member received by said chamber and operative to selectively abuttingly engage said annular shoulders, the inner periphery of the end portion of said outer tubular member remote from said flanged end of said outer tubular member has a recessed portion to receive an annular seal that abuttingly and slidingly engages the outer periphery of said inner tubular member between said flanged end of the inner tubular member and said second circumferentially extending groove, said outer tubular member has a plurality of radially extending ports that interconnect said chamber with atmosphere via the external surface of said outer tubular member, and said inner tubular member having a plurality of circumferentially spaced radially extending ports between said abutment thereon and said second circumferentially extending grooves to interconnect said chamber with the internal bore of said inner tubular member.

2. A universal joint as set forth in claim 1 wherein said annular sealing member is a ring of elastomeric material which contacts a ring of material on the inner surface of said outer tubular member chosen from a group consisting of a polytetrafluoroethylene material and said annular abutment in said chamber has equal area surfaces exposed to each of said annular shoulders to provide a pressure balanced slip joint.

* * * * *